March 24, 1959 N. D. LARKY 2,879,328

COLOR TELEVISION

Filed June 29, 1954 4 Sheets-Sheet 1

INVENTOR.
NORBERT D. LARKY
BY [signature]
ATTORNEY

March 24, 1959 N. D. LARKY 2,879,328

COLOR TELEVISION

Filed June 29, 1954 4 Sheets-Sheet 2

INVENTOR.
NORBERT D. LARKY
BY

ATTORNEY

March 24, 1959 N. D. LARKY 2,879,328

COLOR TELEVISION

Filed June 29, 1954 4 Sheets-Sheet 3

INVENTOR.
NORBERT D. LARKY
BY
ATTORNEY

March 24, 1959 N. D. LARKY 2,879,328

COLOR TELEVISION

Filed June 29, 1954 4 Sheets-Sheet 4

INVENTOR.
NORBERT D. LARKY
BY
ATTORNEY

United States Patent Office 2,879,328

Patented Mar. 24, 1959

2,879,328

COLOR TELEVISION

Norbert David Larky, Somerville, N.J., assignor to Radio Corporation of America, a corporation of Delaware Application June 29, 1954, Serial No. 440,117

6 Claims. (Cl. 178—5.4)

The present invention relates to synchronizing and time multiplexing circuits, and more particularly to synchronizing and time multiplexing circuits of the type employed in color television receivers.

Color television provides the reproduction on the viewing screen of the receiver of not only the relative luminescence and brightness but also the color hue and saturation of the color details in the original scene. The electrical transfer of the color images is accomplished by additive methods. Additive methods produce natural color images by breaking down the light from an object into a predetermined number of selected primary or component colors. Component colors may then be transferred electrically by analyzing the light from an object into not only its image elements as is accomplished by normal scanning procedure, but also by analyzing its light from elemental areas of the image into selected primary or component colors and deriving therefrom a signal representative of each of the selected color components. The color image may then be reproduced at a remote point by appropriate reconstruction from a color signal.

In order that the reproduction of a color image may be achieved with suitable fidelity in a receiver which is adapted to receive color television signals and perform the functions of the reconstruction of the color image on an appropriate color image reproducer, it is important that complete cooperation between the transmitter and the receiver be accomplished. As a result much emphasis is placed on the development and utilization of synchronizing methods in color television wherein it is necessary to not only maintain accurate deflection scanning, but also it is necessary to provide accurate synchronism in the timing of the color signal selection.

In order that the need for color sync signal synchronization of extreme accuracy might be appreciated, consider first the nature of the color television signal which conveys both the monochrome and color image information to the receiving apparatus. It is to be understood that the image information is accompanied by a sound modulated subcarrier which conveys the sound information; this sound subcarrier is located in the transmitted signal spectrum at a position 4½ mc. from the carrier signal of the transmitted video information.

The color television picture is resolved into a set of four different types of signals. One of these component signals is the synchronizing signal which synchronizes the deflection circuits of the receiver with the information which is being transmitted.

The second component color signal is termed the luminance of monochrome information. This information corresponds to the information which is normally transmitted for a monochrome image in black-and-white television signal transmission. When considered in terms of its use in the transmission of color television information, it is important to realize that the luminance or monochrome signal is actually formed by the combination of three primary color signals. It has been found that the component color signals, namely red, green, and blue, which are used in color television, do not appear equally bright because they are located in different parts of the spectrum and hence stimulate the brightness sensation by different amounts. However, if the three primaries are mixed in right proportions, it has been found that the green primary, which is located at the center of the visible spectrum, accounts for 59% of the brightness sensation, while the blue primary accounts for 11% of the brightness sensation, and the red primary accounts for 30% of the brightness sensation. It then follows that it is possible to achieve a monochrome component color television signal by cross-mixing red, green, and blue primary signals according to the proportions whereby 59% green signal, 30% red signal, and 11% blue signal, are combined to form a unit white signal. This resultant signal is termed the monochrome or luminance signal, or when referred to in terms of the circuit components which are used in color television receivers, the Y signal. This Y signal is generated in accordance with existing scanning standards; i.e. 525 lines, 60 fields per second, and 30 frames per second, and should be treated exactly like a standard monochrome signal with respect to bandwidth and the addition of synchronizing and blanking pulses.

The additional signals required to produce a color picture are the chrominance signals and the color synchronizing signals. Consider first the nature of the chrominance signal. It has been shown that the monochrome or luminance signal already contains predetermined amounts of component color signals, namely the Y signal which is made up of, as has been stated, 59% green, 30% red and 11% blue; it then follows that if it is desired that red, green, and blue signals be required, signals of the type $R-Y$, $G-Y$, and $B-Y$ will indicate how each color in the televised scene differs from a monochrome version of the color having the same luminance.

It would appear from the preceding paragraph that to keep the monochrome and the color information representative of a color television picture, means must be provided for transmitting a trio of color-difference signals. Actually, since color-difference information signals are interrelated, it would only be necessary to transmit two of the three color-difference signals with the third color-difference signal being formed at the receiver by suitable recombination of the two transmitted color-difference signals. In the choice of a pair of color-difference signals which are to be formed for inclusion with the color television signals it has been found convenient to adopt a pair of signals known as I and Q signals rather than the color-difference signals of the $R-Y$, $G-Y$, and $B-Y$ type. The I signal is a wide band color-difference signal describing information along what is principally an orange-cyan axis. The Q signal is a narrow band signal which describes information along what is principally a green-purple axis. The choice of the I and Q system rather than, for example, an $R-Y$ and $B-Y$ system is made because the eye has increased acuity for information along the orange-cyan axis. This is tantamount to prescribing that for fine detail, monochrome information is utilized; for large patches of color detail, three-color information is utilized; for intermediate sized patches of color detail, two-color information is utilized.

The manner of transmitting the chrominance information is one involving the use of a unique type of color subcarrier. This color subcarrier has a frequency of approximately 3.58 mc. which is approximately 0.6 mc. removed from the upper edge of the practical video signal transmission band which is located at approximately 4.2 mc. One method of modulating the color subcarrier is one using the two phase modulation technique. In this modulation technique one color subcarrier having a frequency of approximately 3.58 mc. at one phase is amplitude modulated by the I signal; the Q signal is used to amplitude modulate a second subcarrier having the same frequency as the first subcarrier but being 90° apart in phase. The I and Q modulated subcarriers are then combined in a common transmission channel to form a unique type of modulated color subcarrier in which not only are the I and Q information present, but also, as will be described later in the specifications, color information through the entire gamut of the useable color range including the previously mentioned $R-Y$, $G-Y$, and $B-Y$ color-difference information. All of the component hue signals which are included in the modulated color subcarrier will be identified by component signals of a particular phase. The saturation associated with a particular hue will be associated with the amplitude of the component signal having the phase prescribed by the hue. At the receiver the signal information relating to any desired hue may be recovered by employing the processes of synchronous detection; that is, to heterodyne the modulated color subcarrier by a locally generated heterodyning signal having the frequency of the color subcarrier but having the phase associated with a reference. If a multiplicity of hues are required for demodulation at the receiver it follows then that a corresponding set of heterodyning signals must be provided each having the frequency of the modulated color subcarrier and the phase of the corresponding hue.

The color television signal, which represents both signals relating to the monochrome information and the color television signal which includes both hue and saturation information is then transmitted to the color television receiver. It follows from the preceding paragraph that if the processes of synchronous detection are to be employed, then means must be provided for accurately synchronizing the phases of locally generated heterodyning or synchronous detection signals with the color information which is being sent at the transmitter. This is uniquely accomplished by including a color synchronizing burst of approximately 8 cycles of the color subcarrier frequency on the back porch of the horizontal synchronizing pulse. The phase of the color synchronizing burst is such that it leads the I signal by 57°, the I signal in turn leading the Q signal by 90°. The phase of the burst will also bear a predetermined phase relationship with each of the many other hues which are included in the modulated color subcarrier.

In order for the color synchronizing burst to be used to provide synchronous detection signals having accurately controlled phases in the color television receiver, it is evident that frequency and phase synchronizing circuits having unusual characteristics both from the standpoint of accuracy and also the ability to achieve synchronism with a color synchronizing burst of very short duration must be employed in the color television receiver. It is to provide new and improved methods of achieving color synchronizing burst-responsive local oscillator synchronization in a receiver that the present invention is dedicated.

There are many methods for achieving oscillator synchronism which may be useable for synchronizing the color oscillator of a color television receiver with the color synchronizing burst. These methods include the use of reactance tube automatic frequency control and injection-locking. The present invention does not teach a new theory of frequency and phase synchronism; rather it teaches a simplification in circuitry and improvement in performance over and above that which has been hereto possible with circuits of much greater complexity. In addition the present invention utilizes the teachings of J. O. Preisig in his copending U.S. patent application entitled "Color Synchronization," Serial No. 391,800, filed November 12, 1953, in which is taught the principle whereby the color oscillator is turned off or caused to reduce to a low oscillation level at the end of the scanning line and is adapted to resume oscillation at the frequency and phase of the color synchronizing burst. The present invention will involve applications of both reactance tube automatic frequency control and injection-locking, in addition to the start-stop operation taught by Preisig in a unique and simple circuit which has been found to function with the stability essential for the reproduction of high fidelity color television images.

It is therefore an object of this invention to devise an improved color oscillator for a color television receiver.

It is still another object of this invention to provide a start-stop oscillator of improved phase and frequency synchronization characteristics.

It is still another object of this invention to provide a start-stop oscillator in a color television receiver wherein synchronization of improved noise immunity may be obtained with respect to a sync burst.

It is yet a further object of this invention to provide a color oscillator which does not employ resonant circuits other than a piezo-electric crystal resonator for use in a color television receiver.

It is still another object of this invention to provide an automatic frequency controlled color oscillator which utilizes a simplified and improved type of phase discriminator device.

According to the invention, an oscillator is caused to deliver a signal to the control grid of an electron control device. A gated synchronizing burst is also applied to the control grid whereby the electron control device functions as a phase discriminator providing a reference signal at the anode which can be utilized for frequency and phase control of the oscillator.

In another form of the invention, a start-stop burst-synchronized oscillator is provided wherein a gate pulse is applied to a multiplexing grid in the oscillator tube to provide start-stop operation, in addition means are provided whereby both the gated burst and the oscillator feedback voltage are applied to the oscillator control grid with these voltages as applied to the same electrode utilized in novel and new manners.

In one form of the invention the oscillator tube is operated in a manner whereby the combined gated burst and oscillator feedback voltage applied in the oscillator tube causes the oscillator tube to function such that an anode voltage proportional to the phase separation of the gated burst and the oscillator signal may be utilized to apply an AFC biasing voltage to a suitable control electrode of the oscillator tube so that AFC is provided.

In another form of the invention the gated burst is applied through the oscillator tank circuit which is preferably a piezo-electric crystal. The oscillator tank circuit filters the burst and applies the filtered burst to the oscillator control grid where injection-lock action is utilized for synchronizing the oscillator with the color synchronizing burst. This form of circuit may be extended to provide a single tube start-stop burst injection oscillator wherein the only resonant circuit involved is a piezo-electric crystal resonator.

Other and incidental objects and advantages of the present invention will become apparent upon a reading of the following specification and an inspection of the accompanying drawings in which.

Figure 1:
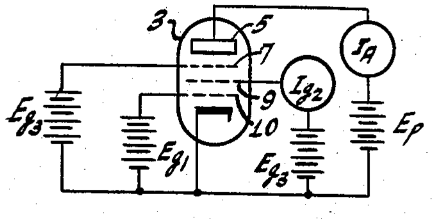
Figure 1 shows a circuit diagram involving a tube of the 6AS6 type which may be used for space charge multiplexing action.
Figure 2:
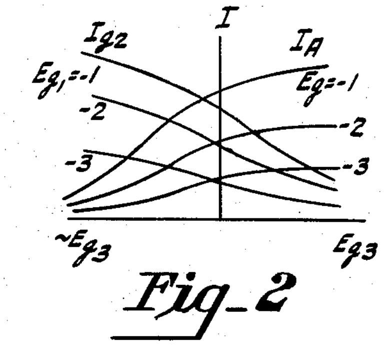
Figure 2 shows plate and screen grid current characteristic curves as a function of the suppressor grid voltage relative to the tube circuit shown in Figure 1.

Consider first the operation of the tube circuit shown in Figure 1 in conjunction with the characteristic curve shown in Figure 2. It is to be noted that the principles taught here are intended to be entirely general since they may be produced by any of several types of vacuum tubes which are commercially available. It is seen in Figure 1 that the tube 3 includes an anode 5, a space charge distribution grid 7, a screen grid 9, and a control grid 10. The action of the space charge distribution grid 7 is such that when the potential of this grid is sufficiently high the majority of the space charge current in the tube 3 will pass to the anode 5 with very little space charge current being collected by the screen grid 9. As the potential of the space charge distribution grid 7 is progressively reduced, less and less current reaches the anode with a greater and greater proportion of the total space current reaching the screen grid 9. If the potential of the space charge distribution grid 7 is made sufficiently low, then a condition can be arrived at whereby virtually no current reaches the anode 5 with the space charge of the tube passing only to the screen grid 9. It is to be noted that this type of operation is possible in tubes which involve more than three screen grids; to achieve the action which is required of one aspect of the present invention it is necessary however that at least one of the control grids within the electron tube control device have the space charge distribution control which has been described. Returning to the tube 3 shown in Figure 1, the characteristic curves shown in Figure 2 clearly demonstrate the result of changing the potential of the space charge distribution grid 7. It is seen that as the potential $E_{g3}$, which is the potential of the space charge distribution grid 7, is increased, the screen grid 9 current $I_{g2}$ decreases with the anode current $I_A$ going through a corresponding increase. As $E_{g3}$ is made negative, it is seen from Figure 2 and $I_A$ is reduced to a very low value with $I_{g2}$ increasing to an extent dependent upon the potential $E_{g1}$ which is the potential of the control grid 10.

Another aspect of the operation of a tube of the type shown in Figure 1 is pertinent to the concepts associated with the present invention. This aspect is concerned with the use of tubes of this type to yield a phase and frequency control discriminator characteristic responsive to a pair of signals. It has been found by the present inventor that if a pair of signals differing in phase and frequency or both are applied to a single electrode of the type, for example, such as the control grid 10 of the tube 3 in Figure 1, the plate current $I_A$ will include a D.-C. component of the form $$I_{Adc}=k \cos \theta$$

where $k$ is a constant and $\theta$ is the phase angle between the two signals involved. This relationship indicates that when the two signals differ by 90° in phase the $I_{Adc}$ will fall to zero; this is characteristic of discriminator action as taught, for example, by inventors such as Vernon D. Landon in his copending U.S. patent application entitled "Color Synchronization," Ser. No. 394,087, filed November 24, 1953, or as taught by Richard W. Sonnenfeldt in his copending U.S. application entitled "Color Television," Ser. No. 429,815, filed May 14, 1954. The teachings of Richard Sonnenfeldt relative to phase discriminator action are realized by utilizing a plurality of electrodes in a single multigrid electron tube; the present invention extends the teachings of Richard Sonnenfeldt to include the obtaining of the discriminator action by use of only a single control electrode in a multigrid electron tube. The teachings of the present invention will, of course, involve several other factors to be discussed which will enhance the overall circuit for use for accurate phase and frequency synchronism in a color television receiver.

The teachings relating to the equation for $I_{Adc}$ follow clearly from the fact that when $\theta=0$, the two signals applied in phase to the control electrode and maximum average current will be realized at the anode. When $\theta=\pi$, which signifies that the two signals are 180° out of phase, a minimum average current will be realized; at $\theta=\pi/2$, a mid value of average current at the anode will be realized thereby causing the curve for average current versus $\theta$ to follow a conventional discriminator characteristic. If limiting action is employed in the grid current, the phase discriminator action may be caused to be relatively insensitive to the amplitudes of the two signals involved.

Figure 3:
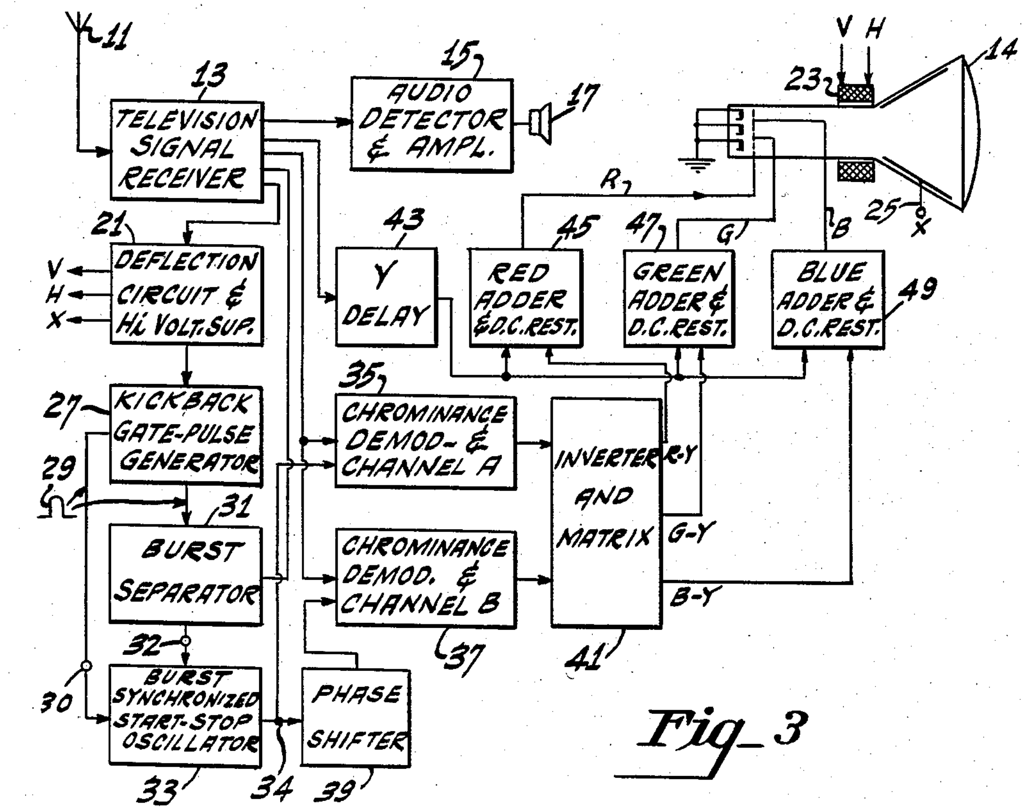
Figure 3 shows a block diagram of a color television receiver which employs the principles of the present invention.

Consider now the block diagram of the color television receiver shown in Figure 3. Here the incoming signal arrives at the antenna 11 and is applied to the television signal receiver 13. The television signal receiver 13 then delivers a recovered color television signal including the sound information, which is transmitted on a sound carrier 4½ mcs. removed from the picture carrier. The television signal receiver 13 includes the functions of first detection, intermediate frequency amplification, second detection and automatic gain control. Many of these functions are described in chapter 22 of the book "Harmonics, Sidebands and Transients in Communication Engineering," by C. Louis Cuccia, published by the McGraw-Hill Book Co. in 1952.

The sound information is then recovered by using, for example, the well known principles of intercarrier sound. By means of the audio detector and amplifier 15, the recovered information is then applied to the loud speaker 17.

The color television signal information relating to the image is accommodated in at least four channels of the color television receiver, these channels being adapted to produce the recovered component color signals which are applied to the color kinescope 14.

One branch emanating from the television signal receiver 13 is concerned with the picture synchronizing signals. This branch is applied to the deflection circuits and high voltage supply 21 which delivers deflection signals to the yokes 23, in addition to a high voltage signal to the ultor 25. Another function of the deflection circuits and high voltage supply 21 is to activate the kickback gate pulse generator 27. The kickback gate pulse generator 27 is usually a winding which is included on the high voltage supply transformer; it has the function of providing a gating pulse 29 during the horizontal blanking period.

Another branch emanating from the television signal receiver 13 is impressed on the burst separator 31 upon which is also impressed the kickback pulse 29. The kickback pulse is timed whereby it opens a burst gate during the duration interval of the color synchronizing burst thereby causing burst separation. The separated burst is then fed by the burst separator 31 to the burst synchronized start-stop oscillator 33 which, utilizing the separated burst and the kickback pulse 29 in a manner to be described, produces a local oscillator signal which is accurately synchronized with the phase and frequency of the color synchronizing burst.

Another branch emanating from the television signal receiver 13 is applied simultaneously to the chrominance demodulator and channel A35 and the chrominance channel and demodulator B37. At the same time, the burst synchronized start-stop oscillator 33 delivers a synchronized synchronous detection signal to the chrominance demodulator and channel A35 and a phase shifted synchronous detection signal to the chrominance demodulator and channel B37 by use of the phase shifter 39. In the chrominance demodulator and channel A35 and the chrominance demodulator and channel B37, synchronous detection of a predetermined group of color-difference signals is realized. These color-difference signals may be I and Q signals, $R-Y$ and $B-Y$ signals, or any group of signals which may be suitable for eventual reconstruction of component color image information.

In addition, suitable filtering action is provided in channel A and the channel B, this filtering action being characteristic of the particular color-difference signals being used. The outputs of the chrominance demodulator and channel A35 and the chrominance demodulator and channel B37 are applied to the inverter and matrix circuit 41 at whose output $R-Y$, $G-Y$, and $B-Y$ signals are realized.

The fourth branch which emanates from the television signal receiver is the Y or luminance channel. The Y signal information is passed through the Y delay line 43 and applied simultaneously to the red adder and D.-C. restorer 45, the green adder and D.-C. restorer 47, and the blue adder and D.-C. restorer 49 to which are also applied the corresponding color-difference signals thereby causing the production of component red, green, and blue signals which are applied to appropriate control grids of the color kinescope 19.

Figure 4:
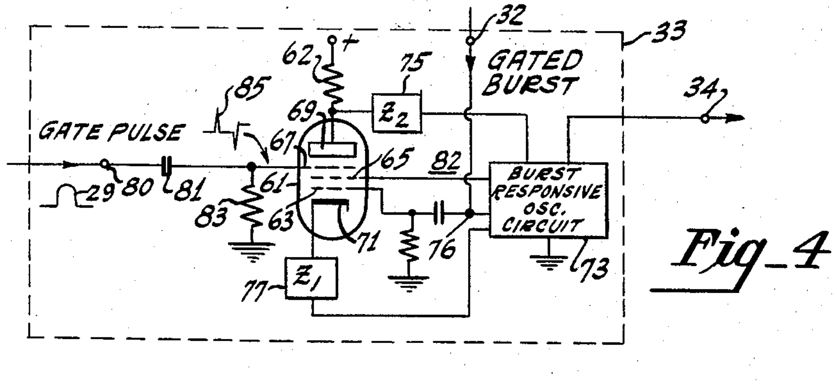
Figure 4 shows a general form of the color oscillator employing the teachings of the present invention.

Figure 4 shows a basic embodiment of the present invention; this basic embodiment concerns a burst synchronized start-stop oscillator 33 whose function is also described in connection with the circuit shown in Figure 3. In the circuit shown in Figure 4 a multigrid electron tube 61 which includes at least the control grid 63, a screen grid 65, a space charge distribution grid 67, an anode 69, and a cathode 71 is included in a circuit which also includes the burst responsive oscillator circuit 73, the impedances 75 and 77 and the gate pulse 29 which is impressed on terminal 80. The action of this circuit will be to utilize the gate pulse either directly on the grid 67 or to utilize the process of differentiation so that a differentiated gate pulse will be appied to the grid 67. The differentiation may be provided by proper design of the condenser 81 and the resistor 83 to provide the differentiated gate pulse 85. The action of either the gate pulse 29 or the differentiated gate pulse 85, depending on which is used, is employed to either cause the burst synchronizing start-stop oscillator 33 to reduce its oscillation level at the end of a scanning line or to cease oscillating entirely at the end of the scanning line so that when it resumes oscillating it will oscillate under the influence of frequency and phase control signals which will insure correct phase and frequency during the succeeding scanning line.

The burst responsive oscillator circuit 73 is coupled to the control grid 63 and the screen grid 65 in addition to employing an impedance 77 to the cathode 71. The impedance 75 is utilized to couple the anode 69 to the burst responsive oscillator circuit 73 in a manner to be described which will enhance automatic frequency and phase control. The general nature of the circuit shown in Figure 4 emphasizes that this invention is concerned with a multipurpose single tube synchronized oscillator circuit; by making the synchronizing circuit simple and involving a single tube not only is the circuit rendered much more economical than corresponding multitube circuits which accomplish the same action but actually, as will be seen, optimum synchronism characteristics can be accomplished in addition to rendering the circuit relatively noise immune with an accurate and positive phase and frequency hold during the entire scanning line.

Figure 5:
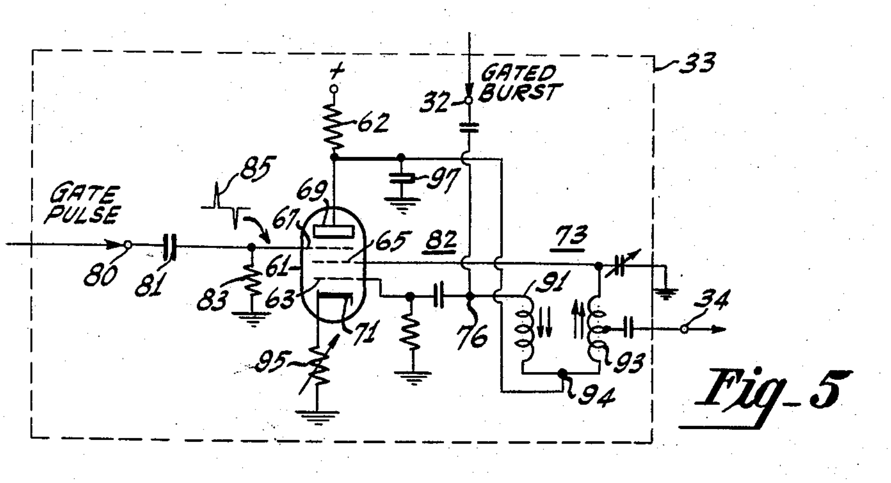
Figure 5 shows a form of the oscillator employing the teachings of the present invention wherein automatic frequency control is provided.

Consider one embodiment of the burst synchronized stop-start oscillator 33 as shown in Figure 5. In this circuit as in the circuit shown in Figure 4, the gate pulse is applied to the terminal 80 so that the differentiated gate pulse 85 is applied to the grid 67. The circuit is so constructed that the burst responsive oscillator circuit 73 consists of the pair of coupled resonators 91 and 93. The resonator 93 as is seen in Figure 5 is connected to the screen grid 65 with the resonator 91 coupled through the grid leak circuit 82 to the control grid 63. The feedback control resistor 95 which is useable for adjusting phase is connected between the cathode 71 and ground. Note that the terminal point 94 to which is connected both the resonators 91 and 93 is connected directly to the anode 69 with the capacitor 97 coupled from the anode 69 to ground. The operation of this circuit may be described as follows. The burst responsive oscillator circuit 73 which is coupled to the screen grid 65 and the control grid 63 causes oscillations to be produced. The gated burst is applied into the grid circuit at the terminal 76. During the duration of the gated burst a D.-C. signal occurs at the anode 69 which, in a manner previously described, is indicative of any phase and frequency difference between the oscillator and the synchronizing burst signals. The feedback control resistor 95 is adjusted to yield the oscillator voltage on the control grid 63 in quadrature with the burst voltage delivered to the control grid 63 when the oscillator has fallen into proper synchronism. This phase and frequency indicative component is transformed into a substantially continuous component by the action of the integrating capacitor 97 and is applied, as is shown in Figure 5, to the terminal 94 which couples this direct current voltage through the resinator 93 to the screen grid 65. Since the frequency of the burst responsive start-stop oscillator 33 is dependent on the potential of the screen grid 65, then by proper adjustment of the magnitude of the voltage provided to the terminal 94 from the anode 69 the oscillator is caused to operate at the frequency and phase of the color synchronizing burst. Note too that action of injecting the gated burst into the grid circuit of the oscillator also produces a certain amount of injection-locking which will augment the automatic frequency control characteristics of this system. The circuit may or may not be used in a manner which employs the gate pulse 29 or the differentiated gate pulse 85 to start-stop the oscillator; however, should this additional function be utilized so that the start-stop oscillator will be stopped or caused to reduce the level of oscillation at the end of each line, then the ability of the oscillator to resume oscillation at the frequency of the color synchronizing burst and to maintain this frequency throughout the next scanning line due to the frequency and phase control aspects of the circuit is enhanced.

The feedback control resistance 95 in Figure 5 is seen to be a resistance of adjustable magnitude. Adjustment of this resistor 95 in magnitude is a useful and simple method for adjusting the phase at which the oscillator oscillates in free-running fashion so as to facilitate the establishing of a locking range over which the burst synchronized oscillator will lock in frequency.

Figure 6:
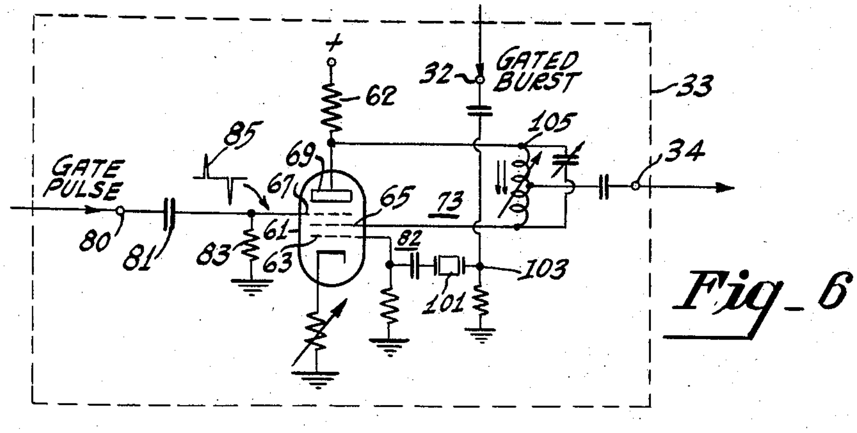
Figure 6 shows a version of the present invention wherein the gated burst is filtered by the oscillator piezo-electric crystal resonator.

Figure 6 shows a variation of the circuit shown in Figure 5. In this circuit the burst responsive oscillator circuit 73 consists principally of the piezo-electric crystal 101 which is connected between the terminal 103 to which the gated burst is applied and the grid leak circuit 82. An output resonant circuit 105 is coupled between the anode 69 and the screen grid 65. The operation of this circuit may be described as follows: the gated burst is applied to the terminal 103. The gated burst is then passed through the piezo-electric crystal 101 which performs the double function of acting as a tank circuit for the burst responsive oscillator circuit 73 and as a filter for the gated burst so as to remove noise frequencies and make the operation of the burst responsive oscillator relatively insensitive to noise. The combined action of the oscillator signal produced by the piezo-electric crystal 101 and the filtered gated burst as provided through the piezo-electric crystal 101 to the control grid 63 causes a voltage component to appear in the current flowing to the anode which is proportional to the frequency difference between the gated burst and the oscillator frequency should such a frequency difference exist. It is to be noted that while oscillations are taking place because of space charge coupling and interelectrode coupling in the tube 61 and because A.-C. components will appear in the circuits connected to the anode 69, the resonant circuit 105 will be excited at the frequency of the oscillator to yield a circuit from which an output signal may be provided. The frequency and phase indicative components of current flowing to the anode 69 and flowing through both the output resistor 62 and the output resonator circuit 105 will create a voltage at the anode which can be utilized to bias the screen grid 65 inasmuch as the resonator 105 provides a direct D.-C. path between the anode 69 and the screen grid 65. Since the frequency of the oscillator will be governed by the potential of the screen grid 65 the action of coupling this screen grid 65 through the resonant circuit 105 to the anode 69 makes this screen grid 65 sensitive to the frequency and phase indicative voltage components which are present at the anode 69. By proper design of this circuit these phase and frequency indicative voltage components as applied to this screen grid 65 may be utilized for automatic frequency control.

It is to be noted that the action of the color synchronizing burst passing through the piezo-electric crystal 101 will also cause injection-locking of the oscillator circuit thereby reducing the demands made on the automatic frequency control part of the circuit. In addition by utilizing the differentiated gated pulse 85 on the grid 67 for achieving either full start-stop action or near full start-stop action between the end of the scanned line and the interval of the color synchronizing burst, the action of the combined injection-lock parameter and the automatic frequency control parameter may be caused to be more effective.

Figure 7:
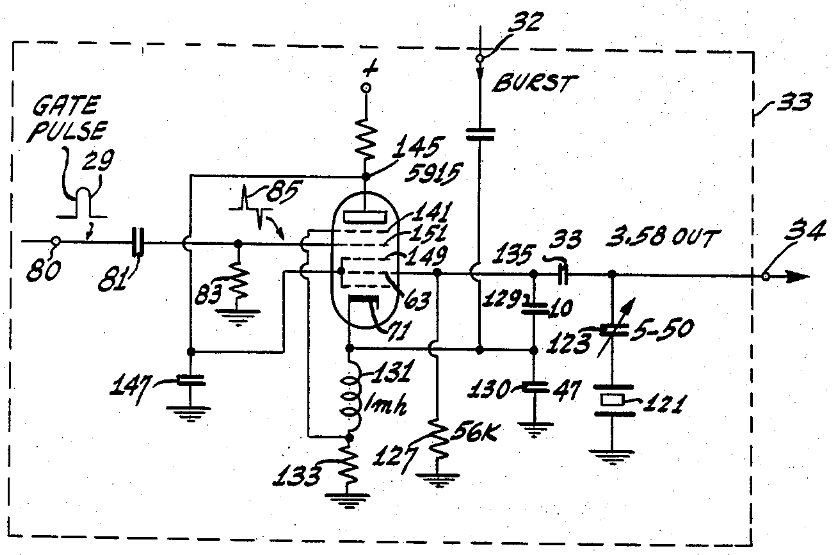
Figure 7 shows yet another version of the present invention involving a circuit in which the only circuit resonant at the oscillator frequency is the piezo-electric crystal oscillator-tank circuit.

Figure 7 shows still another version of the burst responsive start-stop oscillator 33. The circuit as shown in Figure 7 has one advantage in that the only resonant circuit employed is the piezo-electric crystal 121 which is coupled between ground and the control grid 63 utilizing the trimming condenser 123 and the coupling condenser 135 which with the resistance 127 forms a suitable grid leak circuit. Note that coupled between the cathode 71 and ground is the inductance 131 and the resistance 133, also a condenser-divider network made up of the condensers 129 and 130 which is connected between the control grid 63 and ground; the mid-terminal of this condenser voltage-divider is connected to the cathode 71 thereby permitting a feedback so as to yield oscillator action.

Consider now the action of the burst responsive start-stop oscillator circuit 33 shown in Figure 7 responsive to oscillations being developed at its control grid 63 and cathode 71 and a gated burst delivered to the cathode 71 as shown. It follows from the preceding discussion that one of the actions to follow is injection-locking of the oscillator circuit. However, the action of submitting the gated burst to the cathode at the same time that the oscillator is also developing oscillations at the cathode 71 and the control grid 63 provides space charge current components which will be indicative of any phase or frequency difference between the oscillations of the oscillator and of the gated burst. These phase and frequency indicative space charge components will flow through the inductance 131 and the resistance 133 providing a voltage drop across the resistance 133 which is frequency and phase difference indicative. This voltage drop appearing across the resistance 133 is then transferred to the suppressor grid 141 in such a way as to assist in the amplification of the voltage drop produced across the resistor 133 so that an amplified version of this voltage drop will appear at the anode terminal 145. The potential at the anode terminal 145 is then a potential having a component which is indicative of phase and frequency differences which exist between the gated burst and oscillation produced by the oscillator. This phase and frequency difference indicating component is then employed in conjunction with the integrating condenser 147 to provide a frequency controlling voltage to the screen grid 149 which produces automatic frequency control of the oscillator circuit in a manner which will augment the injection-locking of the oscillator by the gated burst during the time interval of the gated burst. If the gate pulse 29 or the differentiated gate pulse 85 is applied to the grid 151 then start-stop action may be added to the overall action of operation of the oscillator circuit. This start-stop action, by stopping or reducing the level of oscillation at the end of the scanning line will permit the oscillator to start up again during the color synchronizing burst interval in the phase and frequency of the color synchronizing burst so that the duty of the automatic frequency control circuit in maintaining the frequency and phase stability during the succeeding scanning line will be eased.

The embodiments illustrating the teachings of the present invention have included "reactance tube" action in the combined-action circuit. It follows, however, that the automatic frequency control voltage produced by the phase and frequency discriminator action can be utilized in conjunction with an external reactance tube which is coupled to a separate oscillator circuit. Such a circuit is shown in Figure 8 wherein a phase discriminator 171 accepts a gate pulse 29, an oscillator signal from the oscillator 205 and a gated burst from the burst separator 31 to develop a control signal which can be applied through the low pass filter 201 to the reactance tube 203 to produce phase and frequency control of the oscillator 205.

Figure 8:
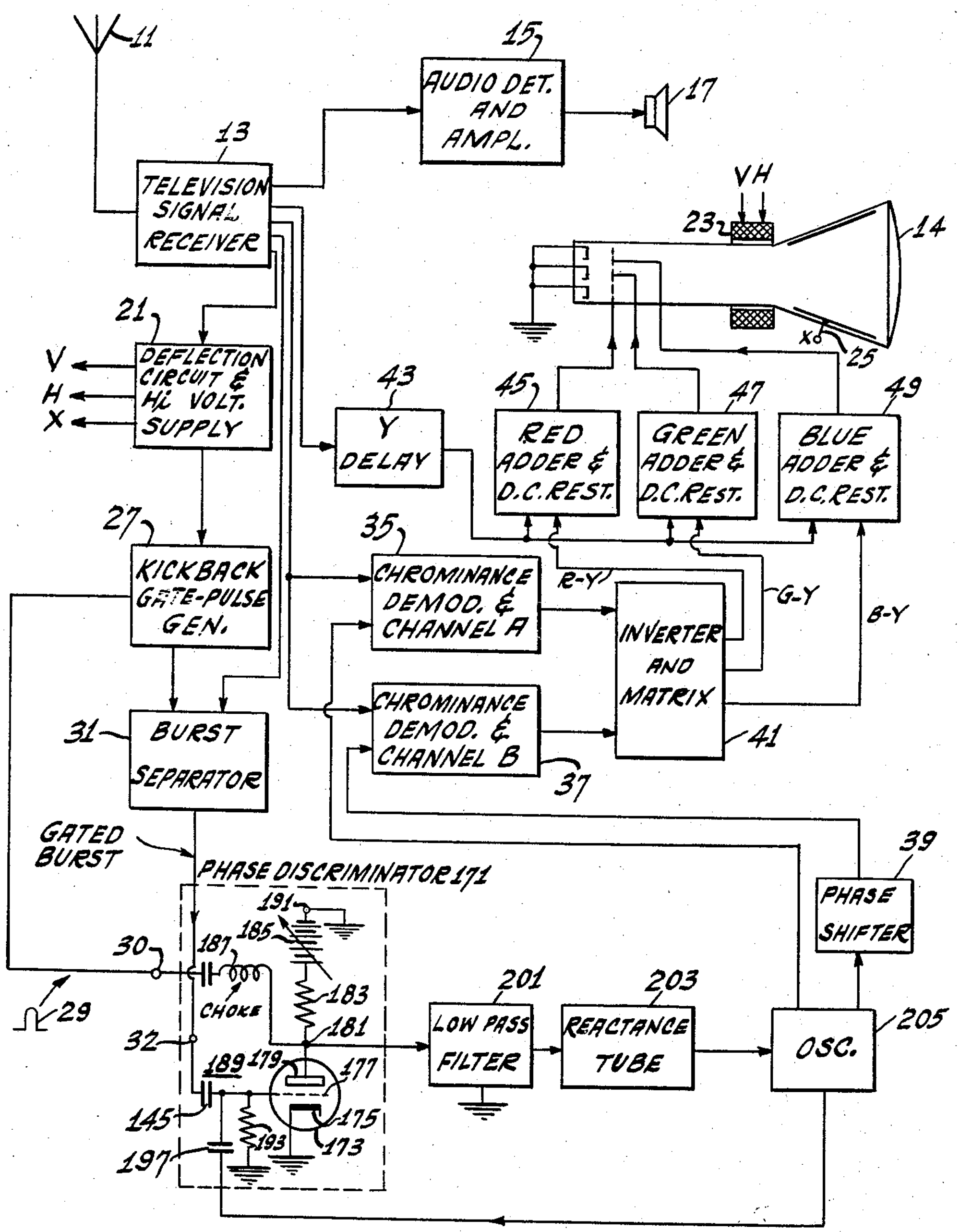
Figure 8 shows a block diagram of a color television receiver utilizing a separate phase discriminator following from the teachings of the present invention.

As is seen from the circuit in Figure 8, the gated burst and the oscillator signal are both applied to the control grid 177 through the grid limiting circuit 189. The gate pulse is applied to the anode to turn the phase discriminator 171 on during the color synchronizing burst to yield a control signal at the anode terminal 181.

The variable potential source 185 may be adjusted to provide for a control signal of zero potential when $\theta=\pi/2$; if the variable potential source 185 is adjusted to yield a sufficiently negative potential at the anode terminal 181, it is possible to operate the phase discriminator 171 with an ungated burst.

Having described the invention, what is claimed is:

1. In a synchronizing circuit, said synchronizing circuit adapted to receive a synchronizing signal, said synchronizing signal having predetermined phase and frequency characteristics and characterized in that said synchronizing signal is not continuous, said synchronizing circuit including in combination a gate pulse generator, said gate pulse generator adjusted to yield gate pulses having predetermined duration intervals relative to said synchronizing signals, a multi-control electrode device having at least a first control electrode, a second control electrode, a third control electrode and an output electrode, an oscillatory circuit, said oscillatory circuit coupled to said first control electrode and said second control electrode, and adjusted to provide oscillations substantially in the vicinity of the phase and frequency of said synchronizing signal, means for applying said synchronizing signal to said first control electrode, means for utilizing said multi-control electrode device to develop a reference signal at said output electrode which is indicative of the phase and frequency difference between said synchronizing signal and oscillations produced in said oscillatory circuit, a frequency control device, said frequency control device responsive to said reference signal and coupled to said oscillatory circuit to cause said oscillatory circuit to produce oscillations at a phase and frequency having a predetermined relationship with respect to the phase and frequency of said synchronizing signal, means for applying said gate pulse to third control electrode of said multi-control electrode device to reduce the amplitude level of the oscillations developed in said oscillatory circuit below a prescribed amplitude level for a predetermined time interval before each of said synchronizing signals.

2. The invention as set forth in claim 1 and wherein are included means to integrate said reference signal, said frequency control device adjusted to be responsive to said integrated reference signal.

3. In a color television receiver, said color television receiver adapted to receive a color television signal including a color synchronizing burst, said color synchronizing bust characterized in that it has a predetermined frequency and phase, a burst synchronized local oscillator circuit comprising in combination, a burst separator circuit, said burst separator circuit including apparatus for separating said synchronized burst from said color television signal to produce a separated color synchronizing burst, a multi-control electrode device having at least a first control electrode, a second control electrode, a third control electrode and an output electrode, an oscillatory circuit, said oscillatory circuit coupled to at least said first control electrode and adjusted to provide oscillations substantially in the vicinity of the phase and frequency of said color synchronizing burst, means for applying said color synchronizing burst to said first control electrode, said multi-control electrode device including apparatus and adjusted whereby a reference signal appears at said output electrode which is indicative of the phase and frequency difference between said color synchronizing burst and said oscillations produced in said oscillatory circuit, means for coupling said reference signal to said second control electrode whereby frequency and phase control of the oscillations produced in said oscillatory circuit is achieved with the oscillations produced in said oscillatory circuit having a predetermined frequency and phase relative to the frequency and phase of said color synchronizing burst.

4. The invention as set forth in claim 3 and whereby said apparatus included with said multi-control electrode device includes an integrating circuit.

5. In a color television receiver, said color television receiver adapted to receive a color television signal including a color synchronizing burst, said color synchronizing burst characterized in that it has a predetermined frequency and phase, a burst synchronized local oscillator circuit comprising in combination, a burst separator circuit, said burst separator circuit including apparatus for separating said color synchronizing burst from said color television signal to produce a separated color synchronizing burst, a multi-control electrode device having at least a first control electrode, a second control electrode, a third control electrode and an output electrode, an oscillatory circuit, said oscillatory circuit coupled to at least said first control electrode and adjusted to provide oscillations substantially in the vicinity of the phase and frequency of said color synchronizing burst, means for applying said color synchronizing burst through said oscillatory circuit to said first control electrode, the action of passing said separated color synchronizing burst through said oscillatory circuit characterized in that it causes a filtering action of said separated color synchronizing burst, said multi-control electrode device including apparatus and adjusted whereby a reference signal appears at said output electrode which is indicative of the phase and frequency difference between said color synchronizing burst and said oscillations produced in said oscillatory circuit, means for coupling said reference signal to said second control electrode whereby frequency and phase control of the oscillations produced in said oscillatory circuit is achieved with the oscillations produced in said oscillatory circuit having a predetermined frequency and phase relative to the frequency and phase of said color synchronizing burst.

6. In a color television receiver adapted to receive a color television signal including color synchronizing bursts having prescribed frequency and phase and occurring during each scanning retrace interval, the combination of: a circuit to separate said bursts from said color television signal and to provide separated bursts, an electron discharge device having at least a first and second control electrode and an output electrode and operative to derive at said output electrode a control voltage representative of the phase relationship between a first and second alternating current wave applied to said first control electrode as a result of said first and second waves applied to said first electrode, oscillation developing means operatively connected to said first and second control electrodes for developing oscillations having substantially said burst frequency at said first electrode and capable of being phase-controlled responsive to a control voltage applied to said second control electrode, means coupled to said burst separating circuit to apply said separated bursts to said oscillation developing means and therefrom to said first control electrode to develop at said anode a control voltage having a magnitude indicative of the phase relationship between said oscillations and said separated bursts, and means for applying said control voltage from said anode to said second control electrode to control the phase of said oscillations, said oscillations developing means including a piezo-electric crystal operative as a tank circuit, said separated burst being passed through said piezo-electric crystal to said first control electrode.

References Cited in the file of this patent

UNITED STATES PATENTS

| | | |
|---|---|---|
| 2,594,380 | Barton | Apr. 29, 1952 |
| 2,653,187 | Luck | Sept. 22, 1952 |
| 2,684,404 | Adler | July 20, 1954 |
| 2,712,568 | Avins | July 5, 1955 |
| 2,713,608 | Sonnenfeldt | July 19, 1955 |
| 2,726,282 | Bigelow | Dec. 6, 1955 |
| 2,740,046 | Tellier | Mar. 27, 1956 |
| 2,743,369 | Sands | Apr. 24, 1956 |
| 2,793,347 | Clark | May 21, 1957 |

OTHER REFERENCES

Design Techniques for Color Television Receiver, Electronics, February 1954, page 143.

Color TV, Rider Publication, March 1954, pages 141 and 142.